Dec. 7, 1943.　　　R. W. LUCE　　　2,336,023
LOCK NUT
Filed May 16, 1940
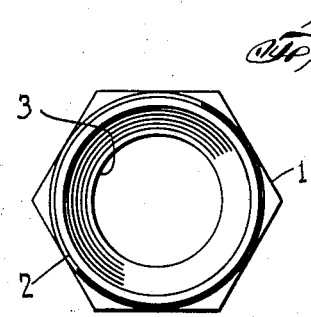
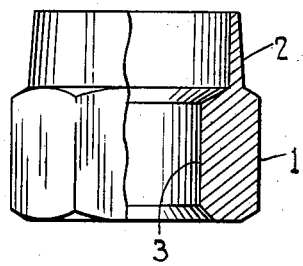
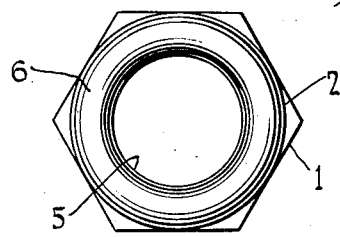
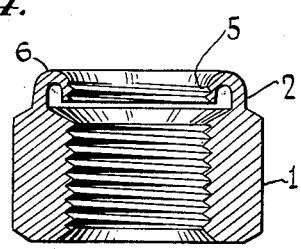
INVENTOR
Richard W. Luce
BY George T. Gill
ATTORNEY Patented Dec. 7, 1943

2,336,023

UNITED STATES PATENT OFFICE 2,336,023

LOCK NUT

Richard W. Luce, Southport, Conn.

Application May 16, 1940, Serial No. 335,472

1 Claim. (Cl. 151—21)

The invention herein disclosed relates to a lock-nut of the type that includes two, united, tapped portions axially spaced and arranged with the threads thereof out of phase.

In various mechanisms, there are many places subject to vibration in which a nut is used for holding parts together that is put on in assembling the mechanism and is not thereafter removed. Instances of this kind are found, for example, in military tanks and in the mounting of bumpers on automobiles. Such applications do not warrant a lock-nut of the kind referred to and which is designed and constructed to be suitable for periodic removal and application to different bolts.

By the invention herein disclosed there is provided a lock-nut that is particularly suitable for a single use or application; it effectively resists loosening under vibration and it is comparatively inexpensive. The nut comprises an internally threaded body which constitutes the nut proper and the threads of which are the load-carrying threads. At one end of the body there is provided an integral, axial, substantially cylindrical extension. The extension is of a diameter slightly less than the distance between opposite flats of the nut body and it is reversely bent inwardly to form a section of the same internal diameter as the body. When reversely bent, the inner section is of a thickness to maintain a complete thread. This section of the extension is tapped simultaneously with the body and thereafter the nut is compressed axially to position the tapped section of the extension with the threads thereof out of phase with the thread of the body.

A lock-nut embodying and illustrating the invention by way of example is disclosed in the accompanying drawing in which:

Fig. 1 is a plan of a nut blank;

Fig. 2 is an elevation of the same, partly in section;

Fig. 3 is a plan of the completed nut; and

Fig. 4 is an axial section of the same.

In Figs. 1 and 2 of the drawing there is disclosed a nut blank from which the nut illustrated in Figs. 3 and 4 and embodying this invention is made. This blank is preferably machined from hexagonal bar stock and includes a nut body 1 which constitutes the nut proper. At one end of the body, there is a cylindrical extension 2. This cylindrical extension is of a diameter slightly less than the distance between opposite flats of the nut body. The thickness of the wall of the cylindrical extension at the outer edge is just sufficient so that upon reversing as hereinafter described a continuous thread may be formed therein of a size suitable for the particular size nut. The cylindrical extension has a wall section that tapers slightly, the walls diverging towards the body of the nut. The body of the nut blank is bored as at 3.

After the blank has been machined to the form described, it is formed and tapped. The forming operation is performed on the extension 2. This forming operation consists in reversely bending the cylindrical extension inwardly as illustrated in Figs. 3 and 4.

By this reverse bending operation, there is formed a section 5 of the same internal diameter as the body 1 of the nut. This section 5 is axially spaced from the end of the body 1 of the nut and it is joined to the body of the nut by the curved section 6 of the extension. When the extension has been formed in this manner, the nut is tapped. The tap is run through both the body portion and the cylindrical section 5 of the extension 2 so that the body portion and the section 5 of the extension each have a thread of the same pitch. When the nut has been tapped, it is compressed axially to move the section 5 towards the body and such that the thread of the section 5 is out of phase with the thread of the body an amount less than one-half of the pitch.

When a bolt is entered in the nut with the section 5 in position with respect to the body such that the threads are out of phase, the bolt to enter the section 5 must first bend the curved section 6 of the extension 2 to bring the thread of the section 5 into coincidence with the thread on the bolt. This arrangement causes the body portion of the nut to be moved axially such that the surface of the thread thereof engages in tight frictional contact with the thread of the bolt. This frictional engagement between the thread of the body and the thread of the bolt is sufficient to resist forces acting to effect a rotation of the nut on the bolt that are due to vibration and shock such as that encountered in service.

The thickness of the wall section of the extension 2 is such that it is, as explained above, just sufficient to maintain a complete thread. With this thickness, the curved section 6 of the extension 2 does not have sufficient resiliency to accommodate ordinary commercial thread tolerances. The wall thickness, however, is not such as to prevent axially relative movement between the section 5 and the body 1 when the bolt is entered therein and it is not such as to effect a bending of the curved section 6 beyond the yieldpoint. In consequence, when the nut is applied to the bolt there is sufficient resiliency to maintain the threads of the body in contact with the threads of the particular bolt to which it is first applied. While this resiliency may be said to be exerted through a minor portion of the displacement of the section 5 and the body of the nut, it is of sufficient magnitude because of the thickness of the wall of the curved portion.

From the foregoing, it will be seen that by this invention there is provided a lock-nut that is suitable for a single application. The lock-nut is inexpensive to manufacture as compared with a lock-nut of this type that is suitable for removal and reapplication as there is no necessity for maintaining wall thickness to high degrees of accuracy in order to obtain a particular resiliency. In addition the nut is readily and easily manufactured on available automatic machinery and does not require delicate or expensive tools.

It will be obvious that various changes may be made by those skilled in the art in the details of the lock-nut illustrated in the drawing and described above and in the steps of the method of making the lock-nut within the principle and scope of the invention as expressed in the appended claim.

I claim:

A lock-nut of the kind described for effecting a friction-tight engagement between the surface of the thread thereof and a bolt entered therein, which lock-nut comprises in combination an internally tapped body portion having the load-carrying threads and a thin wall section extending from the body portion and reversely bent inwardly through an angle of approximately one hundred and eighty degrees to provide a substantially cylindrical end portion axially alined with and spaced from the body portion, the said end portion having a thread of like pitch as the thread of the body portion and the reversely bent portion constituting a resilient portion normally maintaining the threaded portions axially out of phase toward each other, the resilient portion being characterised by the fact that the resiliency thereof is insufficient for repeated accommodation of commercial thread tolerances.

RICHARD W. LUCE.